INVENTOR.
ARTHUR J. WILTSHIRE
BY
McNENNY, FARRINGTON, PEARNE & GORDON
ATTORNEYS 3,674,394
SLIDING CORE MEANS FOR THE MANUFACTURE OF FIBER-REINFORCED PLASTIC TANKS
Arthur J. Wiltshire, Cleveland, Ohio, assignor to Structural Fibers, Inc., Chardon, Ohio
Filed Jan. 18, 1971, Ser. No. 107,075
Int. Cl. B29c 11/00
U.S. Cl. 425—112    5 Claims

ABSTRACT OF THE DISCLOSURE

Apparatus for forming fiber-reinforced plastic articles by fluid pressure, in which a hollow blank of fibrous matting material is positioned within a mold and an inflatable bag is expanded within the blank to force the blank into firm contact with the inner surface of the mold and to compress the blank against the mold. The blank, while in its compressed state, is injected with a predetermined amount of settable resin and the resin is then cured to provide a hollow, fiber-reinforced plastic article. The apparatus according to this invention includes a core having one end slidably received within an access opening in the mold and the other end of the core carries the fibrous blank. An inflatable bag is positioned within the mold and has an inflating stem which extends through the core so that the fibrous blank is between the bag and the inner mold surface. A sealing ring surrounds the core and positions the blank on the core between the bag and the ring. The core is freely slidable within the access opening, at least for an axial distance which corresponds to the desired compression of the blank so that areas of the blank adjacent the core are firmly compressed against the mold surface by the inflatable bag. As the blank is compressed in this manner, the sealing ring forms a seal between the inner surface of the mold and the access opening to prevent resin from flowing into and fouling the access opening.

BACKGROUND OF THE INVENTION

In the manufacture of fiber-reinforced, plastic pressure vessels, such as domestic water softener tanks and similar large, watertight, and chemically resistant, hollow objects, bag molding techniques have been proposed which involve the steps of providing a hollow mold having an inner surface corresponding to the external surface of the article to be molded. A fibrous reinforcing form is laid up within the hollow mold and an expandable bag which will define the shape of the finished article is positioned within the laid up form in the mold. The mold is closed at its ends by rigid casing caps which shape the end walls of the article to be formed therein. The form is then placed under a suitably moderate pressure by expanding the bag to hold the fiber form in place against the mold, and then a metered amount of resin is introduced into the form. The bag is subsequently expanded by further inflation to progressively compress the fiber form in such a manner as to distribute the resin throughout the form and achieve the results of pressure molding. These methods are set forth in Reissue Pat. No. 25,241.

According to the teachings of Reissue Pat. No. 25,241, the flexible bag employed is provided with a rigid fluid conduit through which fluid is introduced into the bag when the mold is closed, and this conduit is inserted upwardly through a central opening in the upper portion of a fiber end wall cap and through a central opening in the upper mold casing cap. The mold apparatus disclosed in the above-identified patent also includes an annular rib which surrounds the central opening in the mold casing cap and which extends axially inwardly of the mold. This annular rib has a diameter slightly less than the diameter of the central opening in the upper fiber end cap so that when the fiber end cap is telescoped into the laid up fibrous form and the end casing cap of the mold is secured in place the fluid conduit of the bag can be pulled axially outwardly relative to the mold to position the bag for the subsequent expanding step, and at the same time to seat the upper fiber end cap around the annular rib. It has been found, however, that the pressure of the bag on the fiber end cap as the conduit is pulled outwardly frequently fails to position the end cap evenly around the annular rib; that is, the end cap will be cocked to one side or the other on the rib so that the outer surface of the end cap is not nested firmly and symmetrically against the inner surface of the end wall casing cap.

To overcome this problem, it has been proposed in U.S. Pat. No. 3,137,898 to provide a mold apparatus which contemplates the elimination of the annular rib from the upper casing cap of the mold and the provision of an improved structure for assembling and positioning the upper fiber end cap within the mold casing cap. In accordance with the teachings of Pat. No. 3,137,898, this was accomplished by a removable core which was adapted to be fitted within the central opening in the fiber end cap before the latter element was telescoped within the laid up fiber matting. This core includes an axially outwardly extending neck which fits within the central opening of the upper end casing cap of the mold to assure that the fiber end cap will always be snugly and symmetrically nested within the inner surface of the casing cap when the mold is assembled. That patent also provides a cup-shaped member which is adapted to be seated in an inverted position on the core below and nested in the fiber end cap. The cup-shaped member is adapted to exert a more uniform compressive force on the fiber end cap when the bag is expanded.

It has been found, however, that the bag, when inflated, stretches somewhat about the bottom portion of the core, since the bag tends to slide the cup-shaped member upwardly along the core surface. Although this stretching only amounts to about one-half inch, each bag is intended to be used in a number of molding operations. Therefore, repeated stretching of each bag tends to weaken the bag in the area of the core and the bag tends to fail in this area. It has been found that each bag has an average life of only 50 molding operations, due primarily to such stretching.

SUMMARY OF THE INVENTION

This invention provides a mold arrangement and molding technique which overcome many problems associated with the foregoing prior art by substantially eliminating localized stretching of the molding bag to thereby increase the life of the bag. These objections are accomplished by providing a core which is axially slidable within the opening in the mold during the molding operation. The core extends through an opening in a hollow blank of fibrous matting material and a sealing ring surrounds the core to position the blank on the core between the ring and the inflatable bag. Since the core is slidable during the application of pressure to the bag, the bag and the core move as a unit as the fiber form is compressed so that the bag does not stretch in the area adjacent the bottom of the core. As the core reaches the limit of its travel, the sealing ring forms a seal between the inner surface of the mold and the opening in the mold to prevent resin from flowing into and fouling the mold opening.

DETAILED DESCRIPTION OF THE INVENTION

Figures 1, 2:
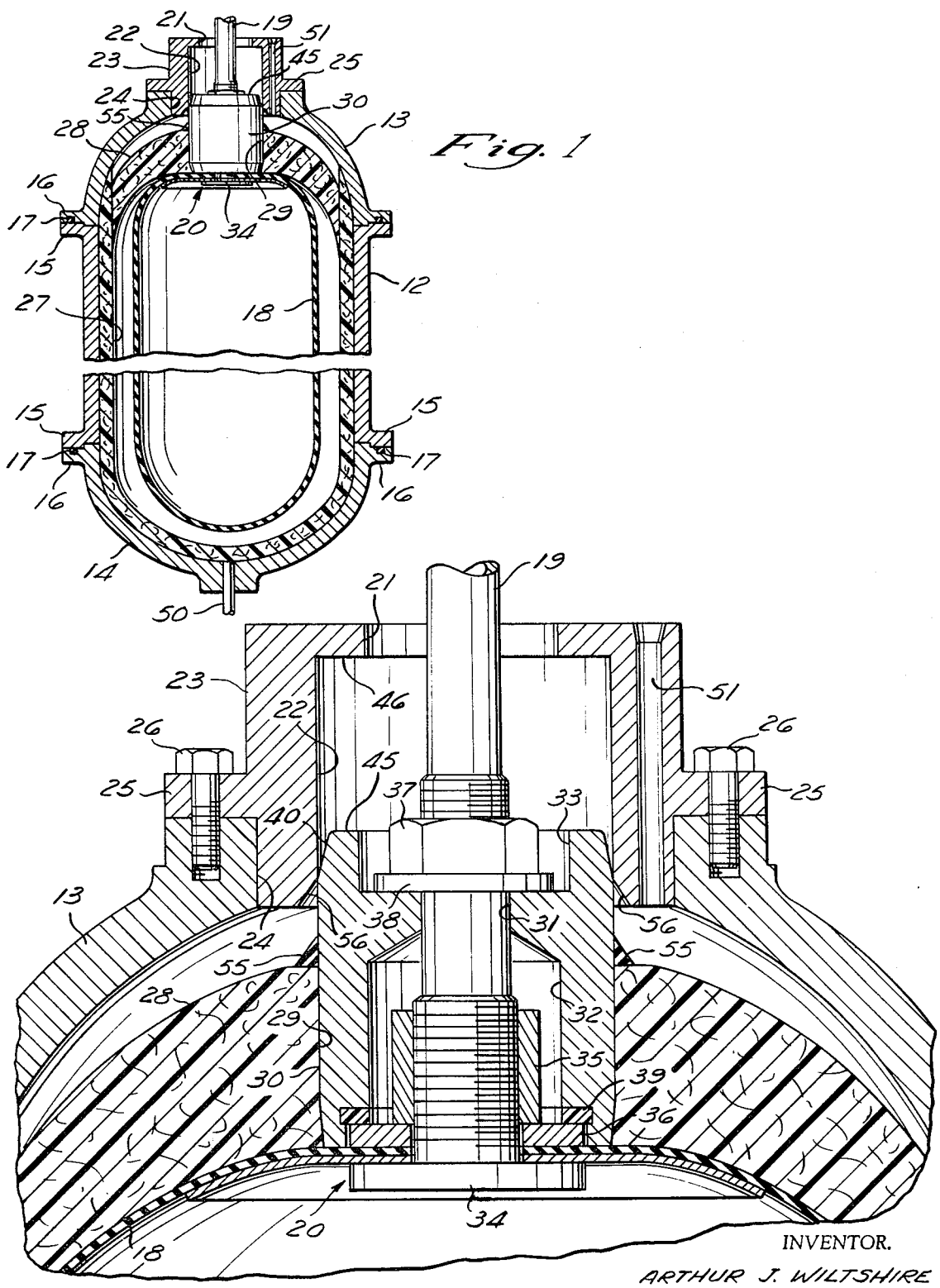
FIG. 1 is a vertical sectional view through the axis of a closed mold casing, with the fibrous shapes disposed therein, illustrating the expandable bag and core position prior to inflation of the bag.
FIG. 2 is an enlarged, fragmentary, sectional view of the upper casing cap of the mold, the upper fiber end cap preform and the associated positioning structure, all shown in a position prior to bag inflation.

Referring now to the drawings, the principal elements of the mold assembly of the invention are shown as including a mold casing 12 and removable end casing caps 13 and 14. Suitable flanges 16 on these caps are provided with sealing rings 17 and are adapted to close against end flanges 15 of the cylindrical mold casing 12. The internal surfaces of the casing caps are in the shape of oblate ellipsoids of revolution, or they may be hemispherical or any other shape which is adapted to the production of a strong tank structure.

An inflatable, flexible bag or envelope comprising a neoprene bag 18 is connected to a threaded fluid conduit 19 by a clamping structure 20 hereinafter described in more detail. The fluid conduit 19 projects axially outwardly of the mold through a bore 21 and a counterbore 22 provided in a casing cap fitting 23. The casing cap fitting 23 is received within a bore 24 in the upper casing cap 13 and has a flange 25 which is fixed to the upper casing cap 13 by bolts 26.

When making a closed end tank, reinforcing fibers, such as glass fibers or equivalent materials, are preformed to form a sidewall-bottom preform 27, preferably in accordance with the teachings of copending application Ser. No. 742,692, filed July 5, 1968. With the upper casing cap 13 removed, the preform 27 is inserted in the cylindrical mold casing. A preformed fiber blank or end cap 28 having an axial opening 29 therein is then positioned on a cylindrical core 30 so that the core 30 extends through the opening 29 in the preform 28. To aid in initially positioning the preform or end cap 28 on the core, a sealing ring 55 is slipped over the core 30 to hold the preform 28 against the upper surface of the bag.

The core 30 has an outside diameter which is adapted to slide within the counterbore 22 and has a central bore 31 therethrough. The core 30 is also provided with a lower counterbore 32 and an upper recess 33. The stem 19 extends through the bore 31 and has its lower end connected to the bag 18 by the clamping structure 20. The clamping structure 20 includes a flared end portion 34 of the tube 19, a sleeve 35, which is threaded onto the lower end of the tube 19, and a washer 36. The bag 18 is clamped between the washer 36 and the flared end portion 34 by tightening the sleeve 35. The stem 19 and the bag 18 are fixed to the core 30 by a nut 37 and a washer 38. The nut 37 is threaded onto an upper portion of the stem 19 so that the washer 38 bears against the recessed portion 33 to thereby draw the washer 36 upwardly against a Teflon seal 39.

After the preform 27 has been positioned within the mold casing 12, and after the preform 28 is positioned on the core 30, the bag 18 is inserted in the preform 27. As the bag 18 is inserted into the preform 27, the end cap 28 is cupped within the open mouth of the preform 27. While holding the stem 19 in an axially aligned position with respect to the mold casing 12 to ensure proper orientation of the end cap 28, the upper casing cap is then applied to the casing 12 to close the mold. During this operation, the core 30 is received within the counterbore 22. Also during this operation the sealing ring 55 holds the preform 28 in a relatively fixed position with respect to the core to prevent canting of the preform 28 and to prevent any substantial axial movement of the preform relative to the core.

To aid in this positioning operation, the upper end of the core 30 is provided with an inwardly tapered surface 40. At this stage in the molding operation, the core may be located in the position illustrated in FIG. 2. However, as will be apparent, the core may be initially positioned at any desired location along the counterbore 22 as long as the core 30 is located within the counterbore 22.

Figure 3:
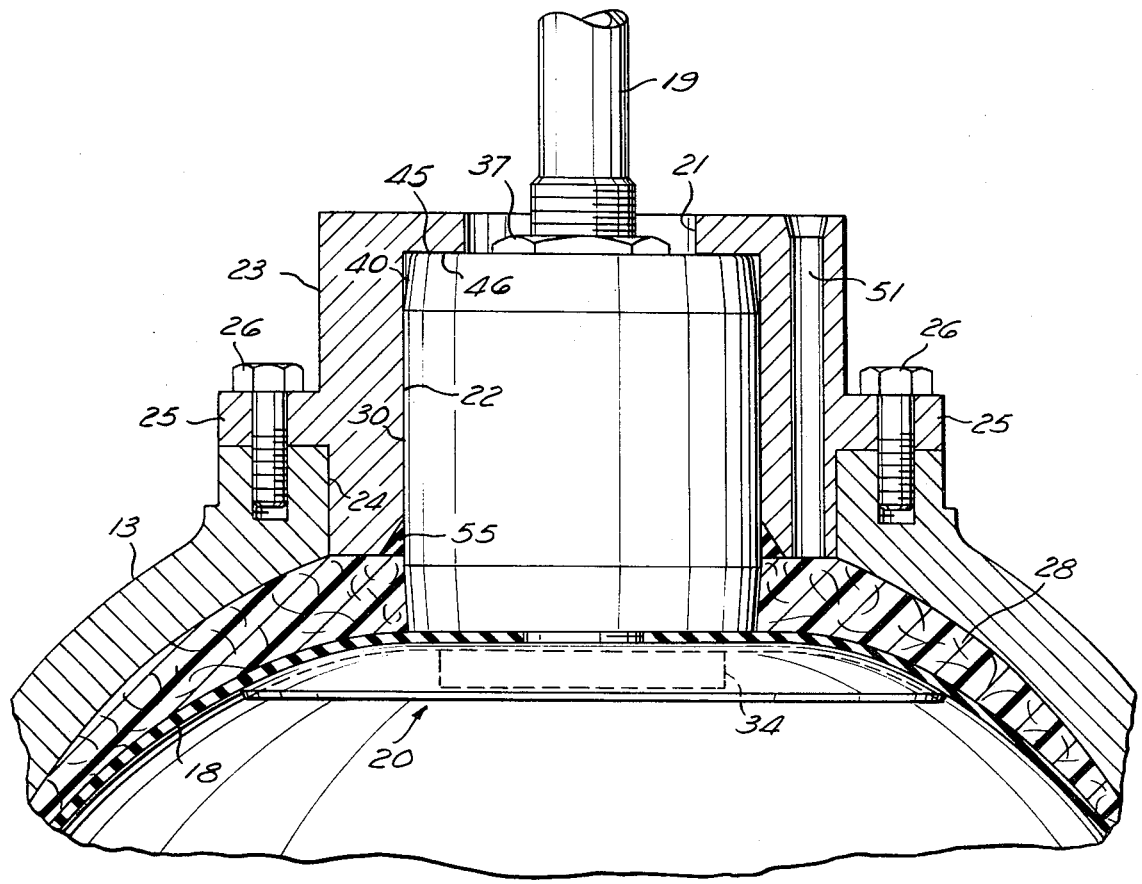
FIG. 3 is a view similar to FIG. 2, but showing the elements in a final position after bag inflation.

The bag 18 is then inflated to bring it into contact over its entire surface with the inner surface of the laid up form of fibrous material. A suitable pressure is about 25 p.s.i. gauge. This pressure is sufficient to drive the core to a final molding position, wherein an upper surface 45 of the core 30 butts against an end surface 46 of the counterbore 22. This position is illustrated in FIG. 3. The initial bag pressure is also sufficient to compress the laid up fibrous preform 27 and end cap 28 to its final thickness. It has been found that a fibrous preform having an initial thickness of about two inches may be compressed to a final thickness of about one-half inch under a pressure of about 25 p.s.i. gauge. Furthermore, higher pressures do not substantially reduce this thickness. Therefore, the axial length of the core 30 and the depth of the counterbore 22 are selected so that the portion of the core 30 which projects from the counterbore 22 (FIG. 3) corresponds substantially to the desired compressed thickness of the portion of the end cap 28 which surrounds the core 30. In this manner, the bag 18 is not flexed to any appreciable extent in the zone where the bag 18 is attached to the core.

As the core moves upwardly from the position illustrated in FIG. 3, the ring 55 enters a sealing ring seat 56 which is provided between the counterbore 22 and the inside surface of the mold. As the bag is further expanded to compress the preform 28 against the inside surface of the mold, the ring 55 is retained in its seat 56 while the core 30 slides upwardly relative to the ring 55.

Liquid resin, which may be any suitable thermosetting resin adapted to set at temperatures above room temperature, is introduced through a supply line 50 in a measured amount. The amount of resin introduced is such that the charge will permeate the entire fiber lining during a subsequent compressing operation. Preferably, a slight excess of resin is provided so that the rising column of resin in the fiber reinforcement will drive out all the air, the excess of resin being allowed to drain from the mold through ducts, such as the duct 51, in the top casing cap 13. The sealing ring 55 prevents the liquid resin from entering and fouling the sliding surface of the core 30. When the air has been driven from the fibrous reinforcement and has escaped from the mold, the ducts are closed by suitable plugs (not shown) and the bag 18 is further pressurized to evenly distribute the resin.

After the fiber body of the article has been thus impregnated and shaped within the mold, and while the shape is maintained by pressure from the bag 18, the casing of the mold is subjected to heat in order to set the resin. When the resin has set, the conduit 19 of the bag 18 is opened to the atmosphere to permit the bag to collapse. The upper casing cap 13 is then removed from the mold casing 12 and the bag and core are pulled axially from the finished molded article. The molded article is then slide longitudinally from the casing 12.

Although a preferred embodiment of this invention is illustrated, it is to be understood that various modifications and rearrangements of parts may be resorted to without departing from the scope of the invention.

What is claimed is:

1. In an apparatus for forming hollow molded articles by fluid pressure in which a hollow, fibrous reinforcing form is positioned within a mold and an inflatable bag is expanded within the form to compress the form from an uncompressed thickness to a predetermined compressed thickness and to force the form into firm contact with the inner surface of the mold, an improved inflatable bag and mold assembly comprising a flexible envelope, a fluid conduit fastened to said envelope and communicating with the interior thereof, core means, said conduit being fixed to and extending through said core means, said core means having a peripheral surface adapted to be snugly engaged within an opening in said form, and having a portion of said peripheral surface extending into means defining an opening in said mold, a sealing ring surrounding the peripheral surface of said core to position said form on the core between said ring and said envelope, said opening defining means having a surface which slidably receives said portion of said peripheral surface, said portion of said peripheral surface being slidable along the surface of said opening at least for a distance which corresponds to the difference between the compressed and uncompressed thickness of said form.

2. The improvement according to claim 1, wherein the portion of the peripheral surface of the core which is not slidably received within said portion has an axial length which corresponds to said difference between the compressed and uncompressed thickness of said form.

3. The improvement according to claim 1, wherein said means defining an opening in said mold includes stop means limiting the sliding movement of said portion of said peripheral surface along the surface defining an opening into said mold and wherein the axial extent of the peripheral surface of the core means corresponds to the distance between said stop means and the inner surface of the mold plus the compressed thickness of said form.

4. The improvement according to claim 1, including seat means between said means defining an opening in said mold and the inner surface of said mold, said seat means being adapted to receive said sealing ring.

5. In an apparatus for forming hollow molded articles by fluid pressure, in which a hollow, fibrous reinforcing form is positioned within a mold and an inflatable bag is expanded within the form to compress the form from an uncompressed thickness to a predetermined compressed thickness and to force the form into firm contact with the inner surface of the mold, an improved inflatable bag and mold assembly comprising a flexible envelope, a fluid conduit fastened to said envelope and communicating with the interior thereof, cylindrical core means, a sealing ring surrounding said core means, said conduit being fixed to and axially extending through said core means, a bore in said mold, said conduit extending through said bore, a cylindrical counterbore, said core means having a cylindrical, peripheral surface adapted to be snugly engaged within an opening in said form and having a portion extending into and being slidably received within said counterbore, said portion being slidable along the surface of said counterbore at least for a distance which corresponds to the difference between the compressed and uncompressed thickness of said form.

References Cited

UNITED STATES PATENTS

| Re. 25,241 | 9/1962 | Randolph | 18—DIG 19 |
|---|---|---|---|
| 2,644,198 | 7/1953 | Crawford | 18—DIG 19 |
| 2,977,269 | 3/1961 | Nerwick | 18—DIG 19 |
| 2,999,272 | 9/1961 | Warnken | 18—DIG 19 |
| 3,137,898 | 6/1964 | Geringer | 18—DIG 19 |
| 3,258,384 | 6/1966 | Scott | 18—45 R X |
| 3,368,239 | 2/1968 | Wiltshire | 18—DIG 19 |
| 3,610,563 | 10/1971 | Allen | 249—65 |

J. HOWARD FLINT, Jr., Primary Examiner

U.S. Cl. X.R.

249—65, 144; 425—195, 389, 417

UNITED STATES PATENT OFFICE
CERTIFICATE OF CORRECTION

Patent No. 3,674,394            Dated July 4, 1972

Inventor(s) ARTHUR J. WILTSHIRE

It is certified that error appears in the above-identified patent and that said Letters Patent are hereby corrected as shown below:

Column 4, line 29, after "in" insert --FIG. 2 to the position illustrated in--; and line 60, cancel "slide" and substitute --slid--.

Signed and sealed this 2nd day of January 1973.

(SEAL)
Attest:

EDWARD M. FLETCHER, JR.            ROBERT GOTTSCHALK
Attesting Officer                      Commissioner of Patents